(12) United States Patent
Puskar-Pasewicz

(10) Patent No.: US 8,485,694 B2
(45) Date of Patent: Jul. 16, 2013

(54) ILLUMINATED ELECTRICAL ENCLOSURE LID

(75) Inventor: John Matthew Puskar-Pasewicz, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 259 days.

(21) Appl. No.: 13/017,131

(22) Filed: Jan. 31, 2011

(65) Prior Publication Data

US 2012/0195052 A1 Aug. 2, 2012

(51) Int. Cl.
*F21V 7/00* (2006.01)
(52) U.S. Cl.
USPC ............................. 362/341; 174/50; 174/520
(58) Field of Classification Search
USPC ................ 362/341; 174/66, 67, 50, 520, 549
See application file for complete search history.

(56) References Cited

U.S. PATENT DOCUMENTS

| | | | |
|---|---|---|---|
| 6,452,100 B1* | 9/2002 | Marcinek | 174/66 |
| 6,717,293 B1* | 4/2004 | Irvine et al. | 307/326 |
| 7,218,511 B1* | 5/2007 | Strozyk | 417/44.1 |
| 7,348,499 B1* | 3/2008 | Cox | 174/549 |
| 7,964,792 B2* | 6/2011 | Edel | 174/50 |
| 2002/0153373 A1* | 10/2002 | Traut et al. | 220/4.02 |
| 2005/0082081 A1* | 4/2005 | Marcou et al. | 174/67 |
| 2008/0011501 A1* | 1/2008 | Gates et al. | 174/50 |
| 2010/0170713 A1* | 7/2010 | Edel | 174/520 |

FOREIGN PATENT DOCUMENTS

| | | |
|---|---|---|
| DE | 20 2006 017 015 U1 | 1/2007 |
| DE | 10 2008 017 541 A1 | 10/2009 |
| DE | 10 2008 029239 A1 | 12/2009 |
| JP | H05 300624 A | 11/1993 |

OTHER PUBLICATIONS

European Patent Office, "International Search Report and Written Opinion", May 3, 2013, 10 pp.

* cited by examiner

*Primary Examiner* — Mary Ellen Bowman
(74) *Attorney, Agent, or Firm* — Eckert Seamans Cherin & Mellott, LLC; Nathaniel C. Wilks

(57) ABSTRACT

An apparatus for an illuminated electrical enclosure lid is provided. The lid has a lid body comprising a front face, a rear face, and at least one translucent edge. The translucent edge projects rearward from the rear face and is configured to be fit onto an electrical enclosure. The lid also has a reflective surface coincident with the rear face. The reflective surface reflects light back into the electrical enclosure. The translucent edge is configured to direct light from the illuminated electrical enclosure lid at a plurality of angles.

20 Claims, 4 Drawing Sheets

ILLUMINATED ELECTRICAL ENCLOSURE LID

BACKGROUND

Electrical enclosures are used widely in residential and commercial applications. Electrical enclosures house devices that primarily communicate with an electrical system. However, many electrical enclosures include visible indicators that communicate a present operating status of the electrical system to a human user. Electrical enclosures are typically placed in areas where they will be out of the way of normal daily activity. Thus, an electrical enclosure may be difficult to find or read, especially when the electrical enclosure is installed in a dimly lit area, such as a closet or basement.

SUMMARY

An apparatus for an illuminated electrical enclosure lid is provided. The lid has a lid body comprising a front face, a rear face, and at least one translucent edge. The translucent edge projects rearward from the rear face and is configured to be fit onto an electrical enclosure. The lid also has a reflective surface coincident with either the front face or the rear face. The reflective surface reflects light back into the electrical enclosure. The translucent edge is configured to direct light from the illuminated electrical enclosure lid at a plurality of angles.

A decal may be used to create the reflective surface. The decal may be configured to cause diffuse reflection within the electrical enclosure. The decal may be mounted to either an interior face or exterior face of the illuminated electrical enclosure lid. A cutout may be included in the decal. The cutout may allow light to escape from the face of the illuminated electrical enclosure lid.

The light within the illuminated electrical enclosure lid may be generated by status indicator lights housed in the electrical enclosure. The status indicator lights indicate the status of an electrical system or specific electrical device. The light of the status indicator lights is reflected at a plurality of angles through the translucent edge. Accordingly, light from the illuminated electrical enclosure lid may be perceived even from behind the electrical enclosure.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

In some circumstances, electrical enclosures are placed in dimly lit areas. For example, in a home, an electrical enclosure that includes status indicator lights may be installed in a basement. The electrical enclosure may house devices that monitor the home's electrical (e.g., sump-pump, furnace, water heater). The electrical enclosure should be easy to locate, even in darkness.

Figure 1:
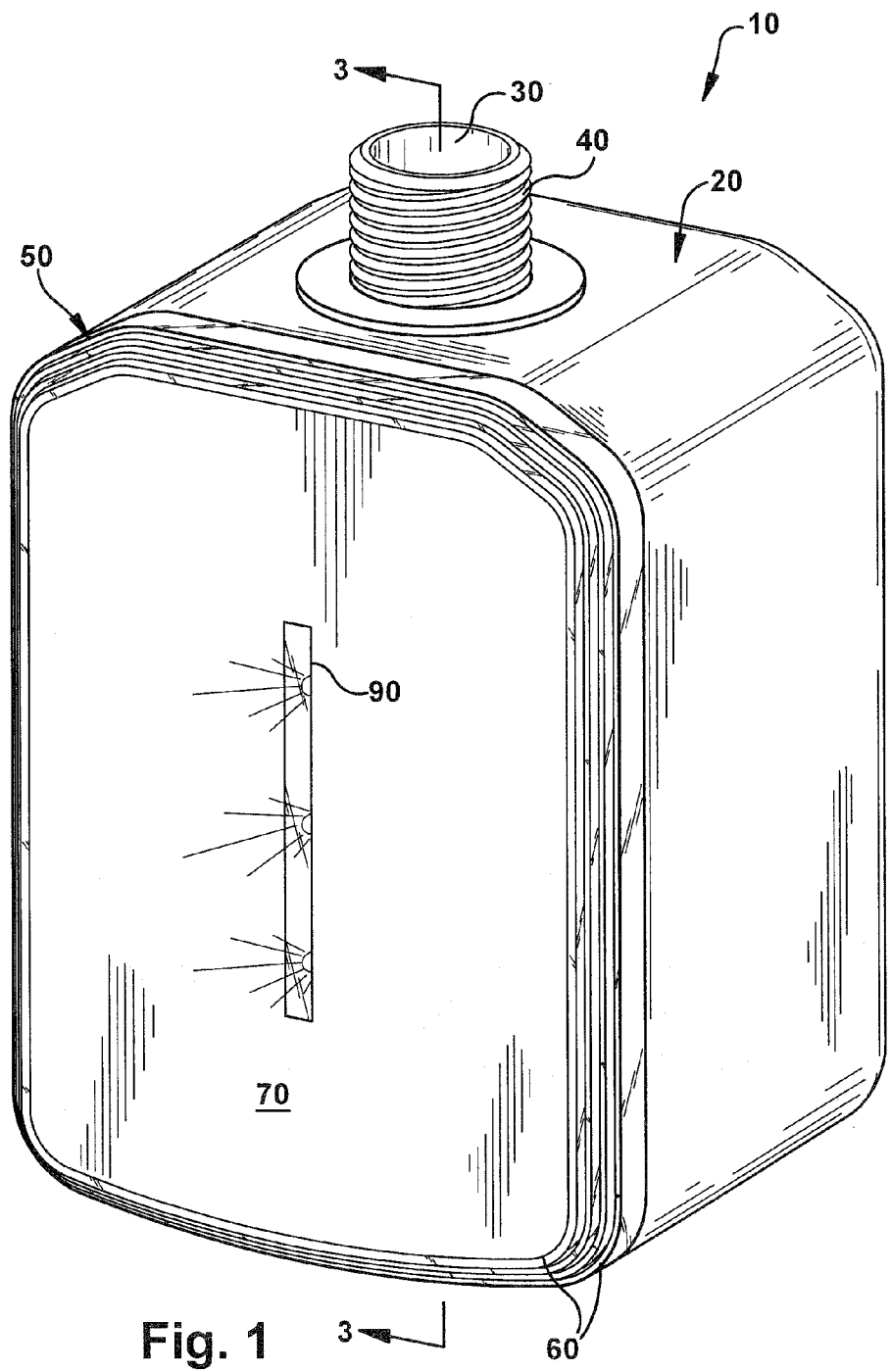
FIG. 1 is a front perspective view of an example embodiment of an illuminated electrical enclosure lid with a decal and translucent edges.

Referring to FIG. 1, a front perspective view of an example embodiment of an electrical enclosure 10 is illustrated. The electrical enclosure 10 includes an electrical enclosure box 20 and an illuminated electrical enclosure lid 50. The illuminated electrical enclosure lid 50 includes a reflective decal 70 mounted to a front face and translucent edges 60. In the embodiment illustrated in FIG. 1, the illuminated electrical enclosure lid 50 is frictionally fitted on or glued to the electrical enclosure box 20. The illuminated electrical enclosure lid 50 may also be attached to the electrical enclosure box 20 with fasteners (e.g., hinges). Alternatively, the illuminated electrical enclosure lid 50 may be molded or formed as a part of the electrical enclosure box 20.

The electrical enclosure box 20 includes a conduit coupling 30. The conduit coupling 30 is a threaded hollow cylindrical passageway protruding from the electrical enclosure box 20. The conduit coupling 30 carries wiring from external systems to the electrical enclosure box 20 for connection to devices housed within the electrical enclosure box 20. A threaded portion 40 of the coupling 30 is configured to be threaded into a mating conduit coupling (not shown).

Figure 2:
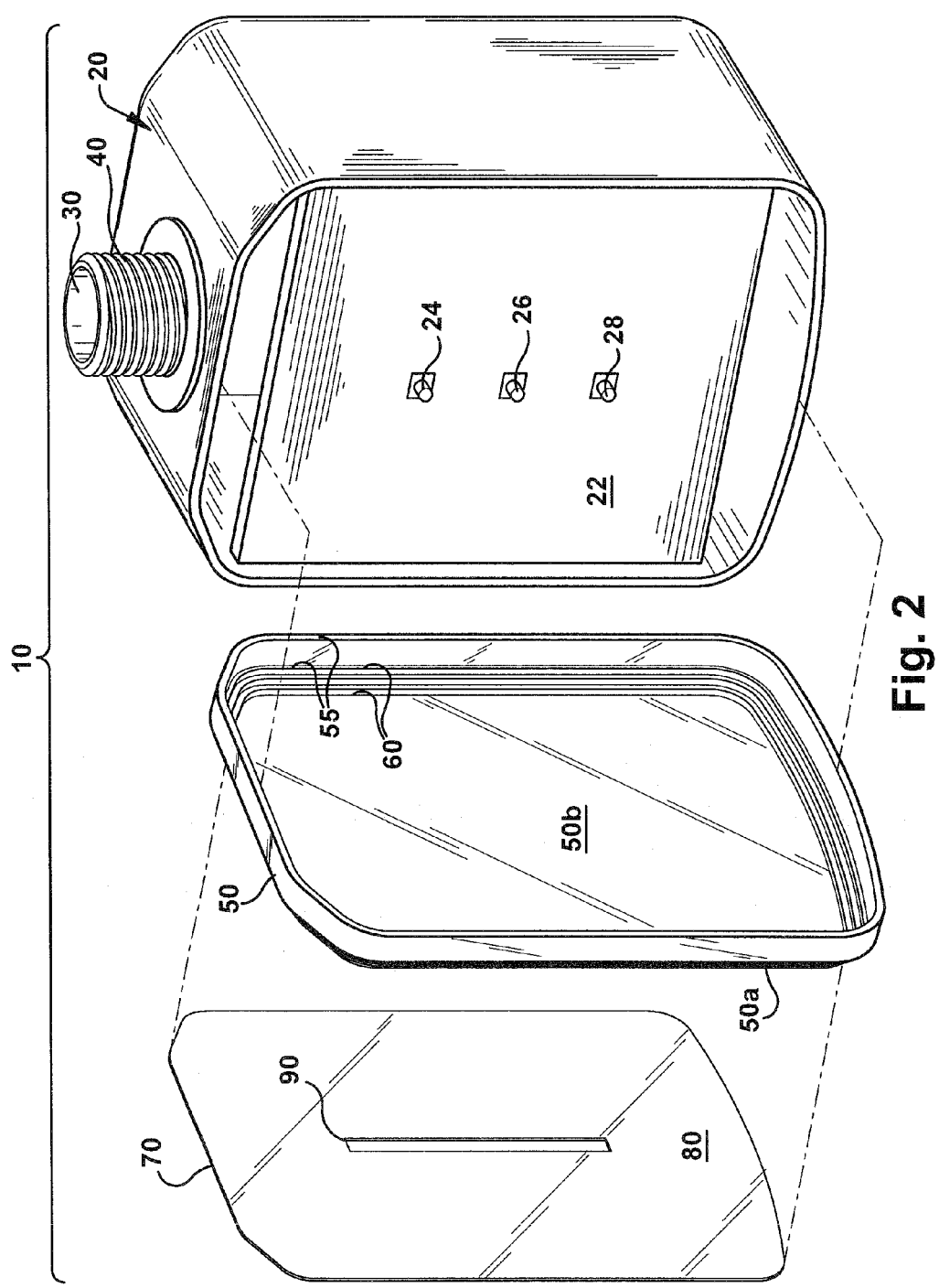
FIG. 2 is an exploded view of the illuminated electrical enclosure lid of FIG. 1 that has a circuit board.

Referring to FIG. 2, the electrical enclosure 10 of FIG. 1 is shown in an exploded view. The illuminated electrical enclosure lid 50 has an exterior face 50a and interior face 50b that forms a portion of the interior of the electrical enclosure 10. The illuminated electrical enclosure lid 50 has a reflective interior surface. The reflective interior surface may be created by the decal 70.

Figure 3:
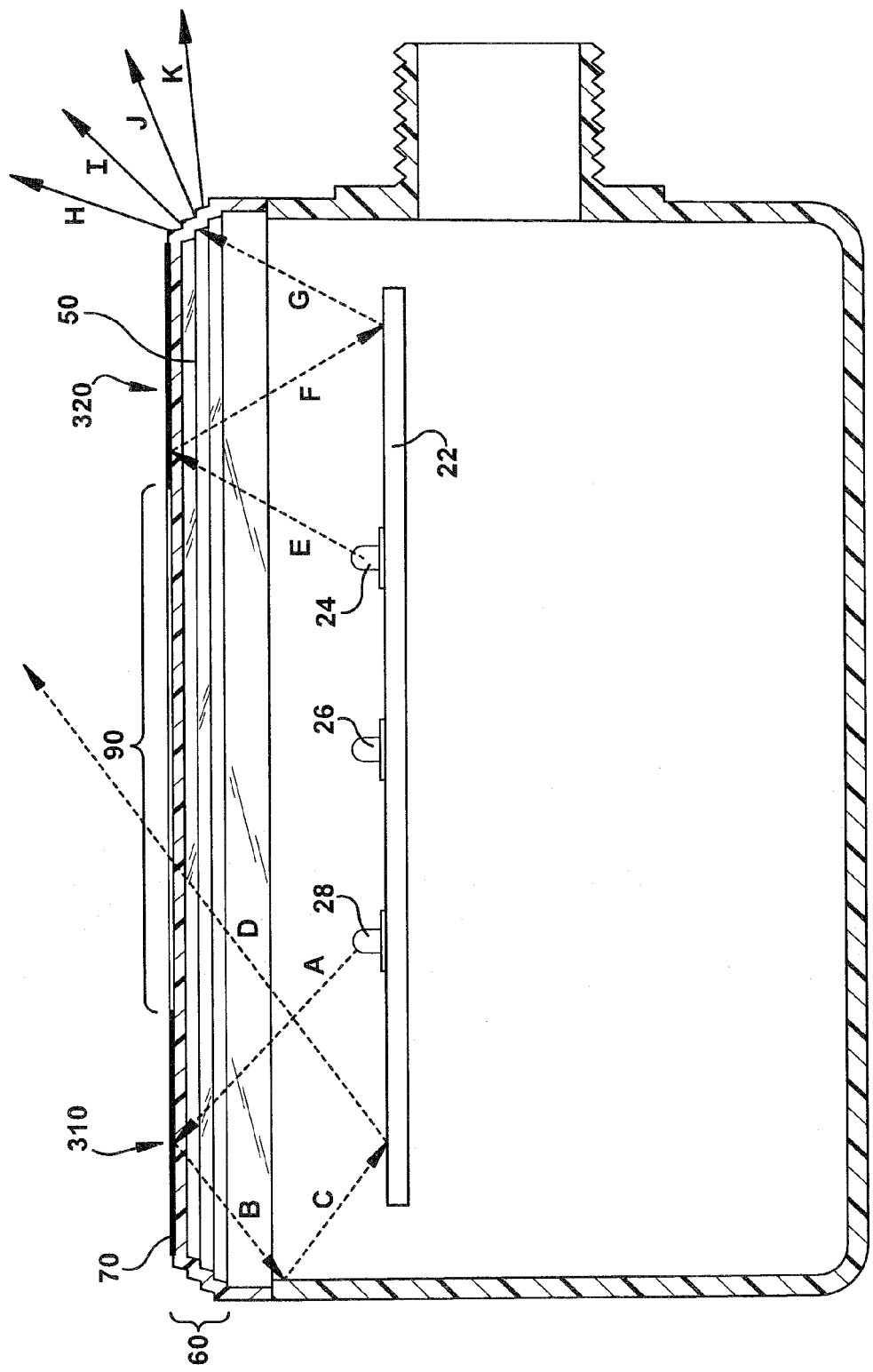
FIG. 3 is a cross section view of an example illuminated electrical enclosure lid of FIG. 1.

The decal 70 may be affixed to either the exterior face 50a or the interior face 50b of the illuminated electrical enclosure lid 50. As will be described in greater detail below, the decal 70 provides a reflective interior surface that will redirect a portion of light within the electrical enclosure 20 to the translucent edges 60. The decal 70 may be affixed to the illuminated electrical enclosure lid 50 with adhesive (e.g., glue) applied to an interior face 80 of the decal 70. If the illuminated electrical enclosure lid 50 is transparent as shown in FIGS. 1-3, the decal 70 may be affixed to the exterior face 50a of the illuminated electrical enclosure lid 50 so that the reflective surface created by the decal 70 is exposed to the interior of the electrical enclosure 10.

The decal 70 blocks light from passing through the illuminated electrical enclosure lid 50 with two exceptions. The decal 70 allows passage of light through a cutout 90 and also through the translucent edges 60. The illumination of the translucent edges 60 and the cutout 90 makes the electrical enclosure easier to find, especially in relative darkness. In other embodiments, other numbers and shapes of cutouts may be used or decal 70 may not include any cutout 90 so that light passes only through the translucent edges 60.

A flat edge 55 of the illuminated electrical enclosure lid 50 is fitted over the electrical enclosure box 20. The electrical enclosure box 20 houses at least one status indicator light.

Status indicator lights 24, 26, and 28 are coupled to a back plate 22. The back plate 22 may be a circuit board configured to receive power and signals from an external electrical system or an electrical device (e.g., sump-pump). The back plate 22 may be hardwired to receive power and signals from external electrical systems through conduit coupling 30. Alternatively, the back plate 22 may merely be used as a mount for the status indicator lights 24, 26 and 28.

The status indicator lights 24, 26, and 28 may be LEDs that can be illuminated individually or in combination. Illumination of the status indicator lights 24, 26, and 28 individually may indicate a status of a specific electrical device. For example, if the sump-pump fails, at least one status indicator light may indicate this by illuminating a sump-pump status indicator light. Alternatively, the status indicator lights may be illuminated at a status "clear" color (e.g., green) when an electrical device is functioning within specified parameters. The status indicator light may be illuminated with a status "alert" color (e.g., red) when an electrical device is functioning outside of specified parameters. Conceivably, the status indicator lights 24, 26, and 28 may be illuminated any number of colors to indicate in any number of statuses for an electrical system or electrical devices.

The status indicator lights 24, 26, and 28 may also be illuminated in combination. More than one of the status indicator lights 24, 26, and 28 may be illuminated to strengthen the light exiting the illuminated electrical enclosure lid 50. As discussed above, the status indicator lights 24, 26, and 28 may be illuminated any color to indicate the status of the electrical system or specific electrical devices. Additional luminary attributes may be used to indicate status. For example, the status indicator lights 24, 26, and 28 may flash or light up in sequence to indicate a status.

The illuminated electrical enclosure lid 50 includes translucent edges 60. The translucent edges 60 are illustrated in FIGS. 1-3 as being stair-stepped at approximately right (e.g., 90 degree) angles. Alternatively, the translucent edges 60 may include a plurality of non-right (e.g., oblique) angles. The plurality of angles in the translucent edges 60 cause light emanating from the interior of the electrical enclosure 10 to be refracted out of the electrical enclosure 10 through the translucent edges 60 at a plurality of angles enhancing visibility of the electrical enclosure box 10. The emanating light may be from the status indicator lights 24, 26, and 28 or, and possibly in addition to, light from a source light (not shown). A source light may not indicate the status of a specific electrical device, but rather function to illuminate the translucent edges of the illuminated electrical enclosure lid 50.

Accordingly, light leaves the illuminated electrical enclosure lid 50 in a plurality of directions from the translucent edges 60. If the electrical enclosure 10 is located in a dimly lit area, the illumination will communicate status information at a distance. The translucent edges 60 allow light to exit at a plurality of angles such that the illumination of the illuminated electrical enclosure lid 50 can be seen not only at a distance but even at an angle. For example, a human user standing at angle from behind the electrical enclosure 10 may note a red light emanating from the translucent edges 60 of the illuminated electrical enclosure lid 50. The red light may alert the human user to more closely examine the status indicated by the electrical enclosure 10.

In the exploded view of FIG. 2, the decal 70 is illustrated as a separate piece on the exterior of the illuminated electrical enclosure lid 50. The decal 70 may instead be affixed on the interior of the illuminated electrical enclosure lid 50. Alternatively, the decal 70 may not be a separate piece but fabricated as a part of or a treatment to the illuminated electrical enclosure lid 50. Additionally, the back plate 22 or the entire interior of the electrical enclosure box 10 may be configured to be reflective.

The cutout 90 in decal 70 may be an additional avenue for light to exit. The cutout 90 allows light to exit through the front face of the illuminated electrical enclosure lid 50. The cutout 90 may be placed in the decal 70 to provide visual access to the status indicator lights 24, 26, and 28. Accordingly, the status indicator lights 24, 26 and 28 could be viewed individually as distinct sources of light rather than through the blending that occurs when light exits the translucent edges 60 at a plurality of angles.

FIG. 3 is a cross section view of the illuminated electrical enclosure lid 50 with the decal 70 and translucent edges 60 as shown in FIG. 1. The illuminated electrical enclosure lid 50 is translucent and may be transparent. The decal 70 is opaque. Light from the status indicator lights 24, 26, and 28 is obstructed from leaving the electrical enclosure 10 by the decal 70. The interior face 80 of the decal 70 is reflective. The interior face 80 of the decal 70 causes light in the electrical enclosure 10 to be reflected off the walls of the electrical enclosure 10 and the back plate 22. Accordingly, light is reflected at a plurality of angles within the electrical enclosure 10.

The light from the electrical enclosure 10 that is visible through the cutout 90 may allow at least one of the status indicator lights 24, 26, and 28 to be distinguishable. The decal 70 may include markings to describe the meaning of the at least one status indicator light. For example, the decal may be labeled to describe that a status indicator light indicates that the sump-pump has failed. Therefore, not only is the electrical enclosure 10 easier to locate, but the markings make it easier to determine the meaning of the at least one status light.

FIG. 3 illustrates possible paths of light within the electrical enclosure 10. Path 310 illustrates light exiting the electrical enclosure 10 through cutout 90. Path 320 illustrates light exiting through the translucent edges 60.

Referring to path 310, Line A emanates from status indicator light 28. Status indicator light 28 is mounted on back plate 22. Line A is directed toward the interior face 80 of the decal 70. The interior face 80 of the decal 70 directs the light back down Line B. The light along Line B strikes an interior wall of the electrical enclosure 10 and is reflected along Line C. Light traveling along Line C strikes the back plate 22. Light from Line C is reflected along Line D and is directed out of the electrical enclosure 10 along Line D through the cutout 90. Therefore, light in the electric enclosure 10 is reflected back inside the electrical enclosure 10 and toward the back plate 22 until the light is on a path directed at the cutout 90.

The interior face 80 of the decal 70 may be configured to reflect light at a plurality of angles. Therefore, the interior face 80 of the decal 70 reflects light along Line A into a plurality of Line Bs rather than a single Line B. A plurality of Line Bs results in a plurality of Line Cs, and a plurality of Cs results in a plurality of Line Ds. Accordingly, more light paths would be created in the electrical enclosure 10, and proportionally more light would be directed through cutout 90.

Referring to path 320, Line E emanates from status indicator light 22. Line E is directed toward the interior face 80 of the decal 70. The interior face 80 of the decal 70 directs the light along Line F. The light of Line F strikes the back plate 22 and is directed along Line G. The light along Line G strikes the translucent edges 60. The stair-stepped angles of the translucent edges 60 cause the light to be refracted in a plurality of directions, illustrated as Lines H-K, out of the electrical enclosure 10. While FIG. 3 shows deflection of light from a status indicator light being directed out of the translucent edges 60, a separate source light could be mounted within the electrical enclosure 10 to illuminate the illuminated electrical enclosure lid 50.

As illustrated with light paths 310 and 320, light exits the electrical enclosure 10 through the translucent edges 60 and the cutout 90. Elsewhere, light is obstructed from exiting the illuminated electrical enclosure lid 50 by decal 70. Therefore, in darkness, the outline of the electrical enclosure 10 and the cutout 90 is illuminated. This makes the electrical enclosure easier to find and to read.

Figure 4:
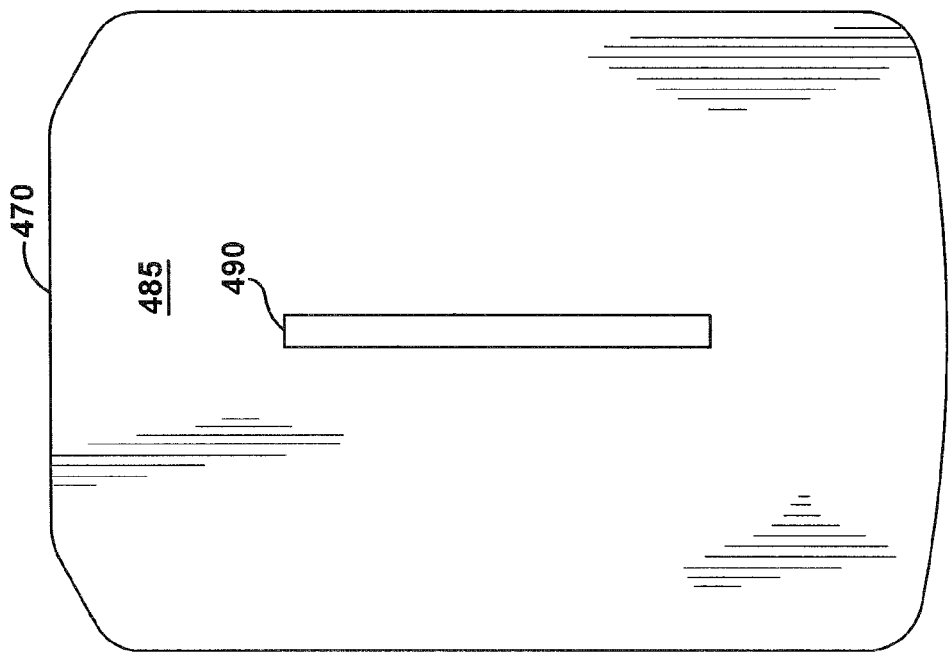
FIG. 4 is a front view of an example embodiment of the decal of FIG. 1.

FIG. 4 illustrates an example embodiment of a decal 470. The decal 470 is opaque. It is not necessary that an exterior face 485 of the decal 470 be reflective. The corners of the decal 470 are flattened to create a generally octagon shape. Therefore, the shape of the outline of light emanating from the translucent edges 60 of the illuminated electrical enclosure lid 50 can be changed by altering the shape of the decal 470. Furthermore, the shape of the decal 470 can be changed to create a particular shape or allow more or less light to exit the electrical enclosure 10.

Likewise, while cutout 490 is shown to be rectangular but can be any other shape or size. The cutout 490 can also be moved from the center of the decal 470 to anywhere else on the decal 470. While a single cutout 490 is shown, multiple cutouts may be used.

Figure 5:
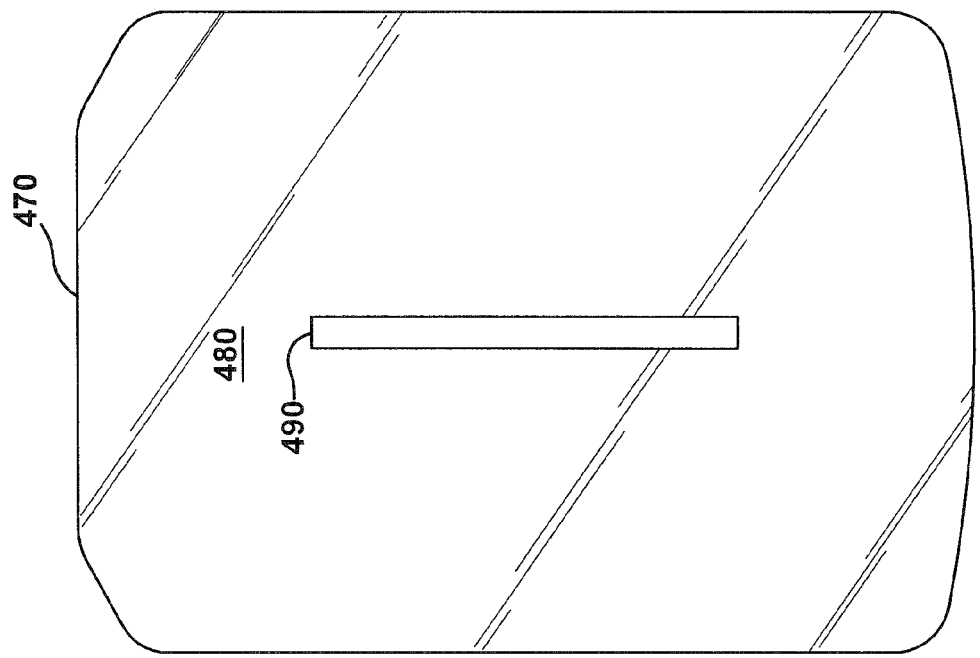
FIG. 5 is a back view of the example embodiment of the decal of FIG. 1.

FIG. 5 illustrates the interior face 480 of the decal 470. The interior face 480 of the decal 470 is reflective. The interior face 480 may be configured to cause diffuse reflection. Diffuse reflection is the reflection of light from a surface such that an incident ray is reflected at many angles rather than at just one angle. Therefore, the reflective interior surface may be configured to generate a plurality of reflected light rays.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An illuminated electrical enclosure lid for use with an electrical enclosure having a light source disposed in an interior volume defined by the electrical enclosure, the illuminated electrical enclosure lid comprising:
   a lid body comprising a front face, a rear face, and at least one translucent edge projecting rearward from the rear face, the lid body being configured to be fit onto the electrical enclosure;
   a reflective surface coincident with one of the front face and the rear face and configured to reflect light from the light source back into the electrical enclosure; and
   wherein the at least one translucent edge is configured to direct the light from the light source to an exterior of the electrical enclosure at a plurality of angles.

2. The illuminated electrical enclosure lid of claim 1, wherein at least one of the front face and the rear face of the lid body includes a decal mounted thereon to create the reflective surface.

3. The illuminated electrical enclosure lid of claim 2, wherein the decal includes a cutout, and wherein the light from the light source is able to exit the lid body through the cutout.

4. The illuminated electrical enclosure lid of claim 3, wherein the light source includes at least one indicator light configured to indicate a status of an electrical device that is in electrical communication with the electrical enclosure; and wherein the cutout is configured to provide visual access to the at least one indicator light.

5. The illuminated electrical enclosure lid of claim 4, where an exterior of the decal has markings to describe the status of the device when the at least one indicator light is illuminated.

6. The illuminated electrical enclosure lid of claim 2, wherein an exterior face of the decal is non-reflective and an interior face of the decal is reflective.

7. The illuminated electrical enclosure lid of claim 1, wherein the reflective surface is configured to cause diffuse reflection of the light from the light source.

8. The illuminated electrical enclosure lid of claim 1, where the at least one translucent edge allows the light from the light source to be perceived from at least one location at the rear of the lid body.

9. The illuminated electrical enclosure lid of claim 1, wherein the at least one translucent edge is a plurality of translucent edges; and wherein the translucent edges are stair-stepped.

10. The illuminated electrical enclosure lid of claim 9, wherein the translucent edges form approximately right angles with each other.

11. The illuminated electrical enclosure lid of claim 9, wherein the translucent edges form non-right angles with each other.

12. An apparatus comprising:
   an electrical enclosure defining an interior volume;
   a light source disposed in the interior volume defined by the electrical enclosure; and
   an illuminated electrical enclosure lid attached to the electrical enclosure, the illuminated electrical enclosure lid comprising:
      a lid body comprising a front face, a rear face, and at least one translucent edge projecting rearward from the rear face, the lid body being configured to be fit onto the electrical enclosure;
      a reflective surface coincident with one of the front face and the rear face and configured to reflect light from the light source back into the electrical enclosure; and
      wherein the at least one translucent edge is configured to direct the light from the light source to an exterior of the electrical enclosure at a plurality of angles.

13. The apparatus of claim 12, wherein at least one of the front face and the rear face of the lid body includes a decal mounted thereon to create the reflective surface.

14. The apparatus of claim 13, wherein the decal includes a cutout; and wherein the light from the light source is able to exit the electrical enclosure through the cutout.

15. The apparatus of claim 12, wherein the light source includes at least one indicator light configured to indicate a status of an electrical device that is in electrical communication with the electrical enclosure.

16. The apparatus of claim 15, wherein the at east one indicator light is visible through the cutout.

17. The apparatus of claim 15, wherein an exterior of the decal has markings to describe the status of the electrical device when the at least one indicator light is illuminated.

18. The apparatus of claim 12, wherein the at least one translucent edge is a plurality of translucent edges; and wherein the translucent edges are stair-stepped.

19. The apparatus of claim 18, wherein the translucent edges form approximately right angles with each other.

20. The apparatus of claim 18, wherein the translucent edges form non-right angles with each other.

* * * * *